(12) United States Patent
Johann et al.

(10) Patent No.: US 10,549,220 B2
(45) Date of Patent: Feb. 4, 2020

(54) CONNECTION HEAD FOR A FILTER CARTRIDGE AND FILTER CARTRIDGE

(71) Applicant: BWT AG, Mondsee (AT)

(72) Inventors: Juergen Johann, Nussloch (DE); Hannes Hittenberger, Tiefgraben (AT); Markus Pichler, Salzburg (AT)

(73) Assignee: BWT AG, Mondsee (AT)

( * ) Notice: Subject to any disclaimer, the term of this patent is extended or adjusted under 35 U.S.C. 154(b) by 0 days.

(21) Appl. No.: 15/647,991

(22) Filed: Jul. 12, 2017

(65) Prior Publication Data

US 2018/0318733 A1 Nov. 8, 2018

(30) Foreign Application Priority Data

May 2, 2017 (DE) .......................... 20 2017 102 570

(51) Int. Cl.
*B01D 29/11* (2006.01)
*B01D 63/06* (2006.01)
*B01D 35/30* (2006.01)

(52) U.S. Cl.
CPC .......... *B01D 29/114* (2013.01); *B01D 35/303* (2013.01); *B01D 63/06* (2013.01); *C02F 2201/006* (2013.01)

(58) Field of Classification Search
CPC .... B01D 29/114; B01D 63/06; B01D 35/303; C02F 2201/006
USPC .......................... 210/223, 444, 446, 442, 449
See application file for complete search history.

(56) References Cited

U.S. PATENT DOCUMENTS

| | | | |
|---|---|---|---|
| 2009/0095671 A1* | 4/2009 | Fritze | B01D 35/147 210/235 |
| 2010/0307964 A1* | 12/2010 | Namur | B01D 35/147 210/209 |
| 2015/0307365 A1* | 10/2015 | Baird | G01M 3/26 210/236 |

* cited by examiner

*Primary Examiner* — Madeline Gonzalez
(74) *Attorney, Agent, or Firm* — Kaplan Breyer Schwarz, LLP

(57) ABSTRACT

A connection head for a filter cartridge, which is easy and safe to handle. The connection head comprises a housing that has an inlet and an outlet, wherein said inlet and outlet have a port to which a detachable adapter piece for water conduit can be mounted. The adapter piece is attachable by a quick-release fastener. The quick-release fastener comprises a locking element, which locks the adapter piece by being rotated by about less than 90°.

12 Claims, 10 Drawing Sheets

Section D-D

Section A-A

Section B-B

Detail C

CONNECTION HEAD FOR A FILTER CARTRIDGE AND FILTER CARTRIDGE

FIELD OF THE INVENTION

The invention relates to a connection head for a filter cartridge which is in particular designed as a filter cartridge that can be installed inline in a water conduit and includes an ion exchange material.

BACKGROUND OF THE INVENTION

Filter cartridges filled with an ion exchange material are known from practice. These are in particular filter cartridges which are connected inline into a water conduit. Such filter cartridges are used in particular in the catering sector, but also in private households for machines for hot beverage preparation, such as coffee machines, for example. A design of a filter cartridge that has a connection head and where the connection head has an inlet and an outlet has been widely adopted.

In conventional filter cartridges known from practice, the inlet and outlet ports are usually formed as an integral component of the housing. If the water ports provided at the installation location, in particular the connection portions of a supply hose and a drain hose, do not fit the port of the filter cartridge, a suitable adapter has to be used, which is usually cumbersome and expensive.

It is furthermore in particular difficult to fasten screw connections in confined spaces.

OBJECT OF THE INVENTION

The invention is therefore based on the object of providing a connection head or a filter cartridge including a connection head which allow for an adaptation, in a simple manner, to the water ports provided at the installation location.

SUMMARY OF THE INVENTION

The object of the invention is already achieved by a connection head for a filter cartridge according to claim 1.

Advantageous embodiments and further modifications of the invention will be apparent from the subject matter of the dependent claims, the description and the drawings.

The invention relates to a connection head for a filter cartridge. More particularly, the invention relates to a connection head for a filter cartridge that is filled with a treatment material, in particular an ion exchange material, and which can be connected inline into a water conduit.

The connection head comprises a housing having an inlet and an outlet. The inlet and outlet can be connected to a water conduit, in particular to a hose.

According to the invention, the inlet and/or the outlet, preferably both the inlet and the outlet, has a port to which a detachable adapter piece for a water conduit can be mounted.

Thus, according to the invention, the connection portion of the inlet and/or the outlet, which serves for the attachment of the water conduit, in particular the hose, is provided in the form of an adapter piece that is detachable from the housing and to which the water conduit can be directly connected.

Here, in addition to the port on the end of the connection head, the adapter piece has a port for the water conduit, in particular a threaded portion or a plug-in nozzle for a hose, or is inseparably connected to a water conduit, in particular a hose.

In this manner, the connection head of the filter cartridge can be easily equipped with different connection pieces.

The adapter piece may, for example, be provided with different diameters or different threads or as an angled and non-angled version so as to easily adapt the connection head of the filter cartridge to the connection conditions existing at the installation location.

The one or more ports of the connection head for the adapter piece are preferably designed so as to be at least partially recessed in the housing. Preferably, the ports protrude less than 2 cm from the housing wall. In this manner, a particularly compact design can be achieved.

In a preferred embodiment of the invention, the adapter piece can be attached by means of a quick-release fastener. Quick-release fastener refers to an embodiment in which the adapter piece can be mounted by the user without using tools.

The quick-release fastener that is provided in particular comprises a locking element which locks the adapter piece by a rotation of about less than 90°, and preferably by a rotation of approximately 45°.

Already by slidingly mounting the quick-release fastener, the adapter piece is preferably both mechanically fixed and connected to the port in liquid-tight manner. With the locking, a higher contact pressure is achieved which even withstands pressures of more than 3 bar. Thus, the adapter piece may as well be easily actuated from a lateral side even in a confined installation position.

In a preferred embodiment of the invention, the locking element is slidingly mountable on the port of the connection head.

In particular, it is contemplated that first the adapter piece can be placed on the port in a manner so as to be already secured to the extent that it will not fall down. This may be accomplished, for example, by being slidingly placed on a tubular portion of the port.

Then the locking element is slidingly mounted, preferably from a lateral side, and through a rotary movement the adapter piece is locked so that a pressure-resistant, tight connection is now established.

In an alternative embodiment of the invention, the locking element is configured so as to unlock or lock the adapter piece by a sliding movement. In particular, the locking element may be provided in the form of a slidable sleeve.

In one embodiment of the invention, the quick-release fastener is designed so that upon locking of the quick-release fastener, the detachable adapter piece is urged onto the port with an axial force.

In this manner, the tightness of the connection can be improved.

This can be achieved, for example, by providing two corresponding sliding elements that have a slope or at least one sliding element that has an inclined surface.

In a preferred embodiment of the invention, the locking element jams in a locked end position.

According to a further preferred embodiment of the invention it is contemplated that the locking element is latched in a locked end position.

In one embodiment of the invention, the detachable adapter piece is secured against rotation relative to the port.

In particular it is contemplated that the adapter piece can be employed in positions rotated about 90° or less, preferably in positions rotated about 30°, and is secured against rotation in the respective position.

In particular when using angular adapter pieces it is easily possible in this manner to align the adapter piece in optimal manner to a port provided at the installation location.

The securing against rotation is preferably achieved in form-fitting manner. In contrast to a protection against rotation imparted by clamping, for example, this provides a connection with anti-rotation protection which will not yield even in the case of quite large forces that may be encountered when a hose is installed, for example.

The adapter piece preferably has a connection portion for a water conduit. The connection portion is in particular designed as a thread or as a plug-in sleeve for a hose.

In a further embodiment of the invention, the adapter piece is inseparably connected to a water conduit in the form of a hose. In particular, a hose is clamped onto the adapter piece, for example by means of a clamping sleeve. This may in particular be an armored hose.

Thus, it is not necessary to provide a hose, in particular an armored hose, with a coupling nut, so that a more cost-efficient and more compact configuration of the connection is provided.

In one embodiment of the invention, the connection head comprises an actuating element for an adjustable bypass.

The adjustable bypass is part of a blending device which can be used to adjust the proportion of the incoming water that flows through an ion exchanger. In this manner, the filter cartridge can be easily adjusted as a function of the degree of hardness of the water, the water port provided at the installation location, and the desired hardness.

In a preferred embodiment of the invention, the housing has seats for a wall holder.

It is in particular contemplated that the housing can be installed in a claw- or yoke-shaped wall holder.

The invention furthermore relates to a kit that comprises a connection head as described above and at least two different adapter pieces. The adapter pieces in particular have a different port for a hose, for example plug-in sleeves of different diameters, threads of different diameters, or they have an angled shape and a not angled shape.

The invention furthermore relates to a filter cartridge which is equipped with the connection head described above.

BRIEF DESCRIPTION OF THE DRAWINGS

The subject matter of the invention will now be explained in more detail by way of an exemplary embodiment and with reference to the drawings of FIGS. 1 through 18.

DETAILED DESCRIPTION

Figure 1:
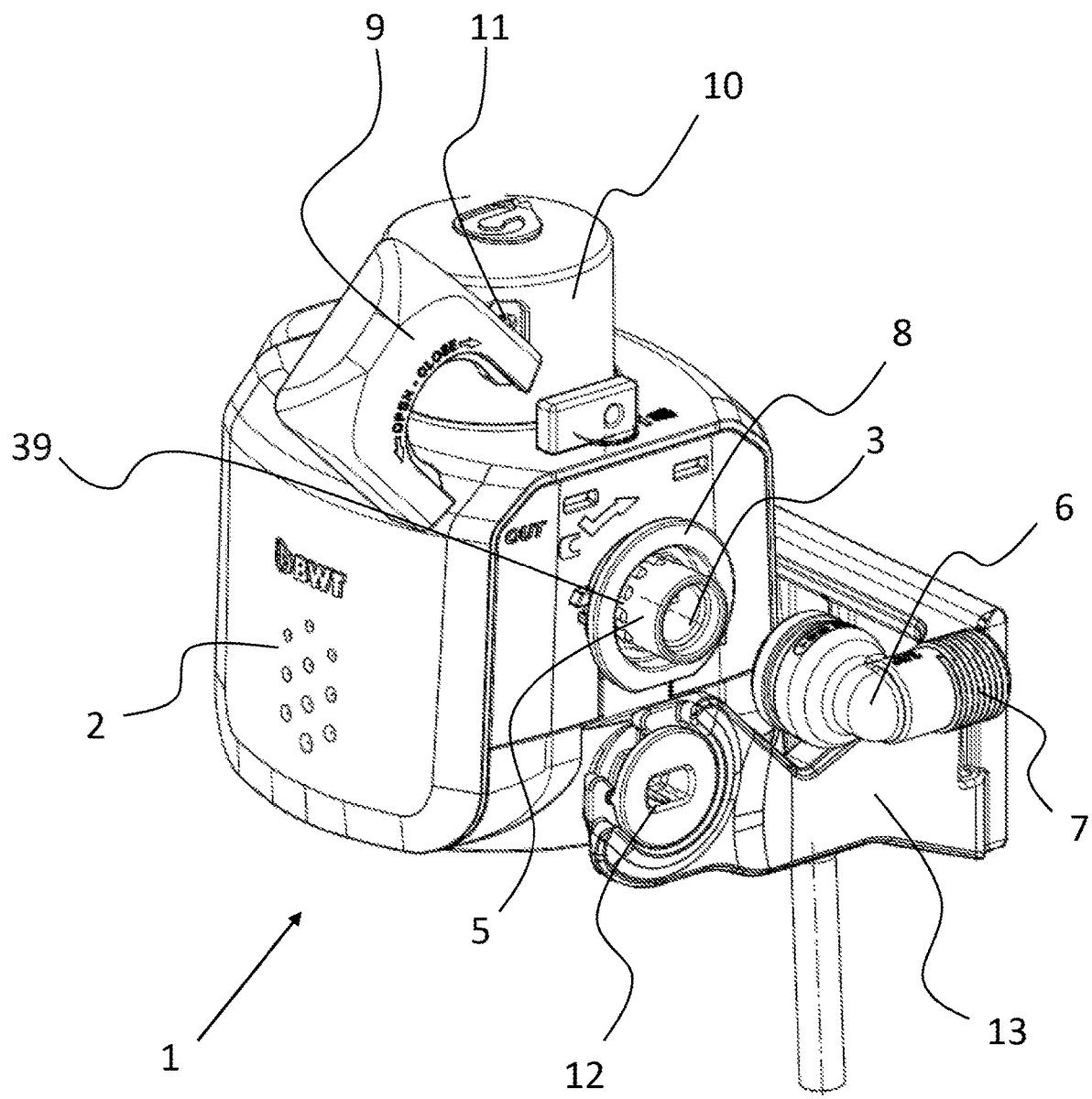
FIG. 1 is a perspective view of a connection head according to the invention.

FIG. 1 is a perspective view of an exemplary embodiment of a connection head 1 of a filter cartridge. The connection head 1 is connected to a housing of the filter cartridge (not shown here), which is filled with an ion exchange material.

Connection head 1 comprises a housing 2 having an inlet and the outlet 3 that can be seen here.

Outlet 3 comprises a port 5 for an adapter piece 6.

Adapter piece 6 has a hose port 7.

Port 5 of outlet 3 has an annular collar 8.

Between the collar 8 and the tubular portion of port 5, an annular groove 39 is provided, into which the adapter piece 6 can be inserted.

Furthermore, a locking element 9 is shown.

In the view of FIG. 1, the adapter piece 6 and the locking element 9 are still separated from the rest of the connection head 1.

The inlet and the outlet 3 are preferably located on opposite side walls of the connection head 1.

In this embodiment, the connection head 1 further comprises an actuating element 10 for a bypass. The bypass allows to adjust how much of the incoming fresh water is passed through the ion exchanger. In this manner, the degree of hardness of the treated water can be adjusted.

In the vicinity of the actuating element 10, the connection head 1 has a window 11 which permits to read the setting of the actuating element 10 for the bypass.

Furthermore, the connection head 1 has seats 12 for a wall holder 13, below the inlet and the outlet 3.

The wall holder 13 is essentially U-shaped and comprises claw-like extensions in which the seats 12 can be placed.

Thus, the wall holder 13 may first be mounted on the wall.

Then, the filter cartridge with the connection head 1 can be installed in the wall holder 13.

Referring to the perspective views of FIGS. 2 to 4 it will now be explained how the adapter piece 6 is mounted to the connection head 1.

Figure 2:
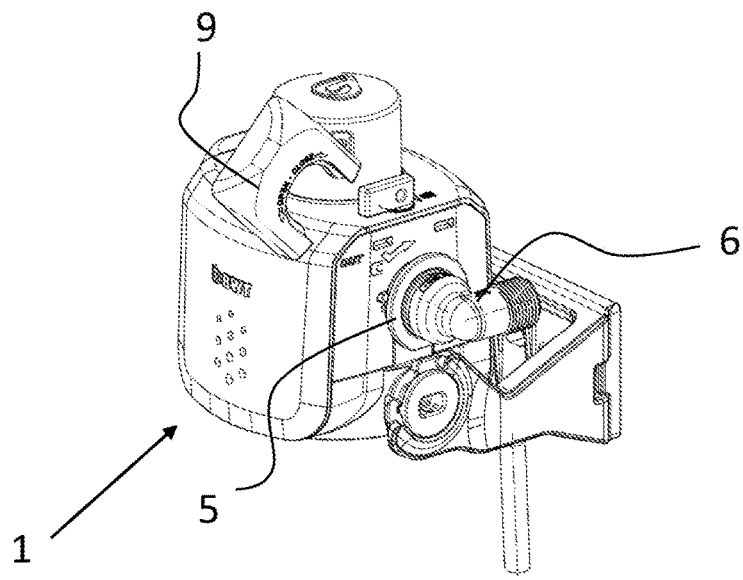
FIGS. 2 to 4 are perspective views illustrating the attachment of an adapter piece on the connection head.

As illustrated in FIG. 2, the adapter piece 6 is inserted into the port 5 in a first step, more particularly into the annular groove 39 illustrated in FIG. 1.

The adapter piece 6 is now already secured at the connection head 1 so that it cannot fall off.

Figure 3:
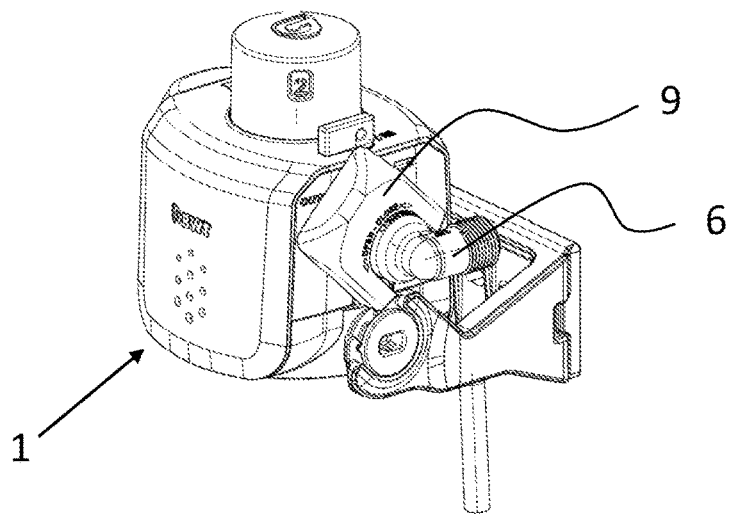

Then, the locking element 9 is slidingly mounted, as shown in FIG. 3.

Figure 4:
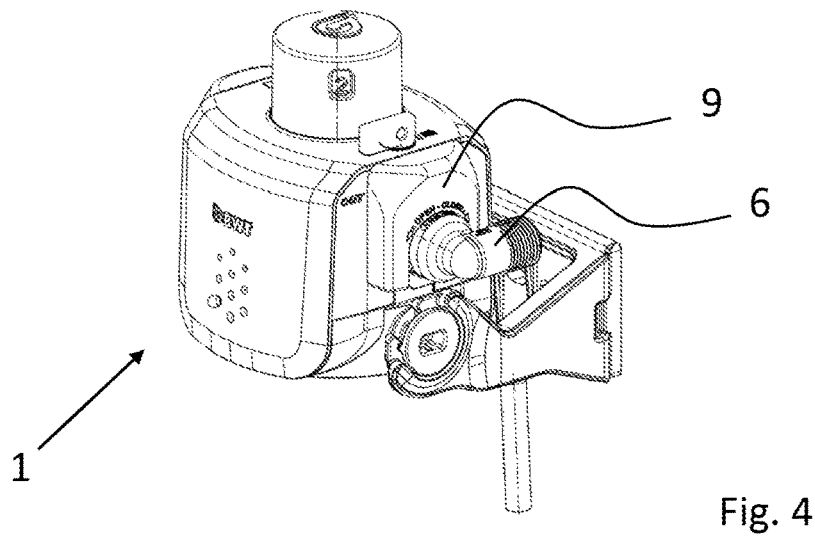

In the present exemplary embodiment, the locking element is first slidingly mounted from a lateral side and is then locked by a rotational movement, preferably a rotational movement of 90° or less, in particular 45°, as illustrated in FIG. 4.

The adapter piece 6 is now firmly and pressure-tightly joined to the rest of connection head 1.

By using the locking element 9 which constitutes a quick-release fastener, it is easily possible to replace the adapter piece 6 by other adapter pieces in order to adapt the connection head 1 to different connection conditions at the installation site.

Figure 5:
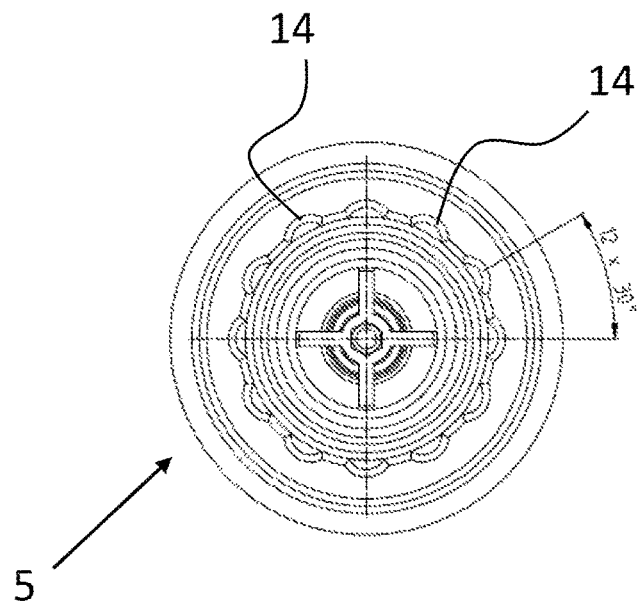
FIG. 5 is a detailed view of the port for the adapter piece.

FIG. 5 is a detailed view of the port 5 for the adapter piece.

It can be seen that port 5 has form-fitting features 14.

In this exemplary embodiment, the form-fitting features 14 are provided in the form of arcuate projections as seen in cross section.

Twelve projections are distributed around the circumference of the connection portion.

The corresponding adapter piece can be mounted in rotation-protected manner in twelve different positions spaced by 30° to one another in each case.

This is particularly advantageous in the case of angle-shaped adapter pieces. In this manner, the hose port can be easily oriented upwards, downwards, or to one of the lateral sides, for example.

Figure 6:
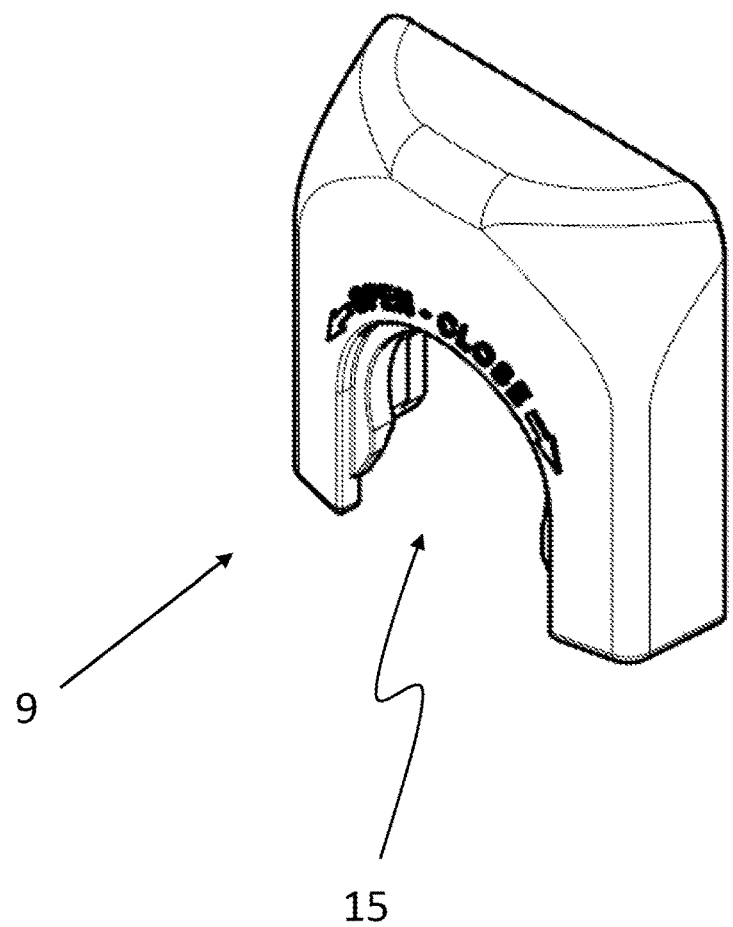
FIG. 6 is a perspective view of a locking element used for a quick-release fastener.

FIG. 6 is a perspective view of the locking element 9.

Locking element 9 is essentially U-shaped so that it can be slidingly placed on the port 5 from a lateral side.

Accordingly, the locking element 9 has a recess 15 that opens to one side, thereby defining the mounting orientation.

Figure 7:
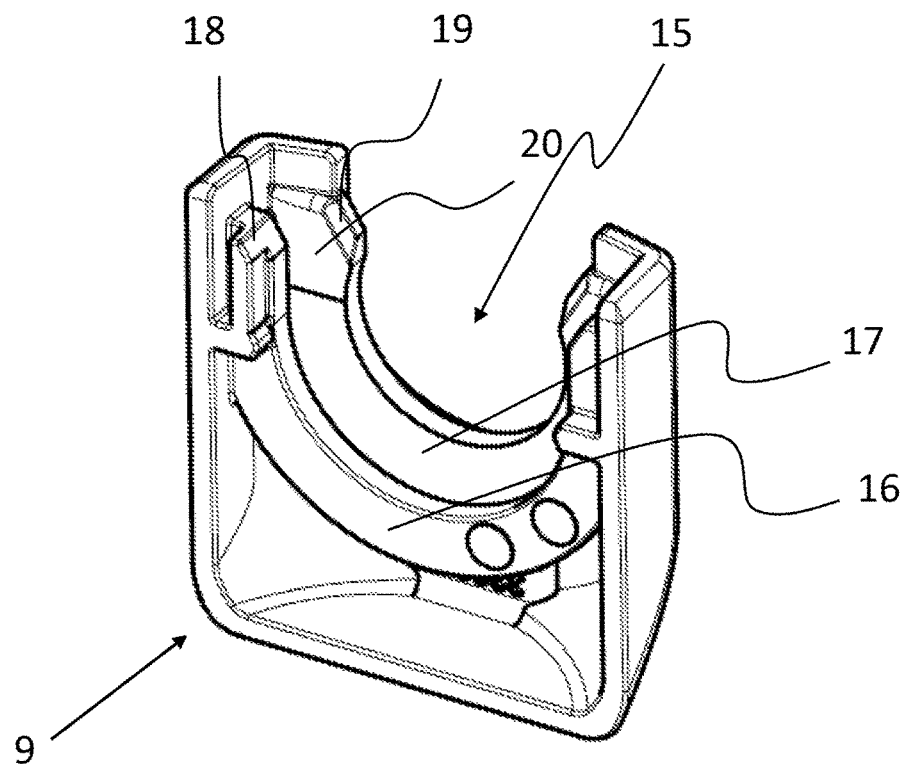
FIGS. 7 to 10 are further views of the locking element, with FIG. 10 being a sectional view.

FIG. 7 is a perspective view of locking element 9, illustrating the underside of locking element 9.

Two collars 16, 17 can be seen, which are spaced from each other.

Collars 16 and 17 extend around recess 15, and recess 15 is larger in the range of collar 16 than in the range of collar 17.

Collar 16 serves to rotatably connect the locking element 9 to a port 5 of the connection head.

For this purpose, locking element 9 with its collar 16 is slidingly placed below the collar 8 of port 5 illustrated in FIG. 1.

Collar 17, on the other hand, engages in a corresponding groove of the adapter piece (36 in FIG. 11) so as to fix the adapter piece in the axial direction.

On the open end of recess 15, collars 16 and 17 each have a bevel 18, 19 so that the locking element 9 can be arranged in place more easily.

Furthermore, collar 17 has a thickened portion 20 on the open end.

Due to this thickened portion, the locking element 9 will be secured against falling off as soon as it has been placed, due to the corresponding groove (36 in FIG. 11) along with a molded gasket (40 in FIG. 20) of the adapter piece.

Figure 8:
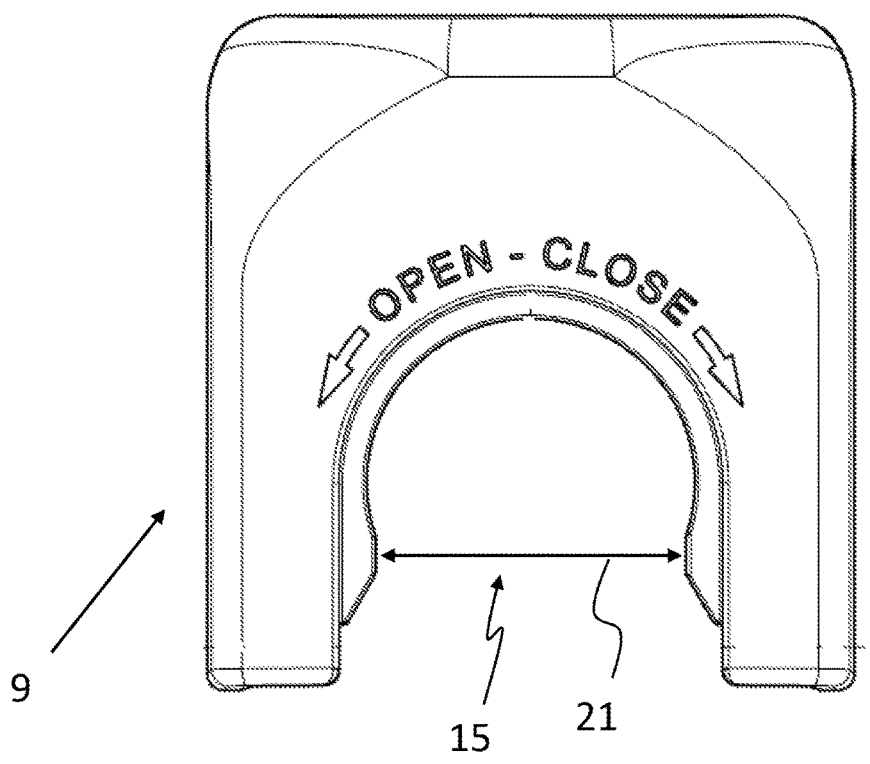

FIG. 8 is a plan view of the front side of locking element 9.

It can be seen that the recess 15 tapers in the vicinity of the open end and thus defines a passage 21 that is smaller than the diameter of a circular section of the recess 15 therebehind.

Thus, the opposed wings of the locking element 9 on either side of the passage 21 are effective as a clamping feature and also secure the locking element 9 against falling off once the latter has been slidingly placed from a lateral side.

Figure 9:
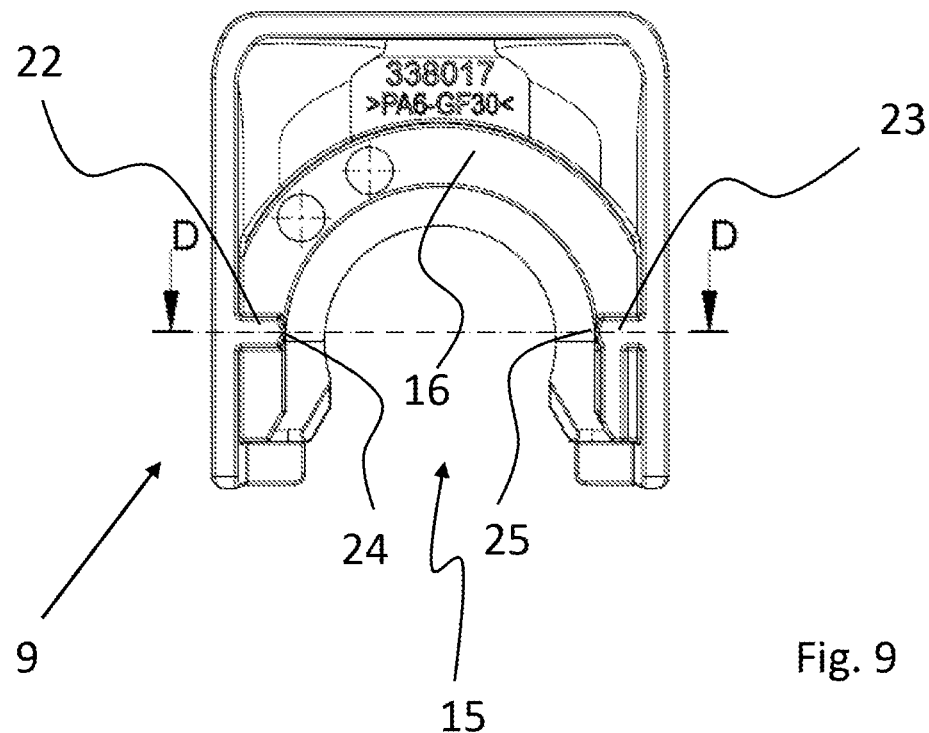

FIG. 9 is a plan view of the underside of locking element 9.

Below collar 16, the locking element has two opposing ribs 22, 23 on the lateral sides thereof. Ribs 22, 23 are oriented towards the center of recess 15. At their ends, the ribs 22, 23 each have a lug 24, 25, which are preferably rounded.

Figure 10:
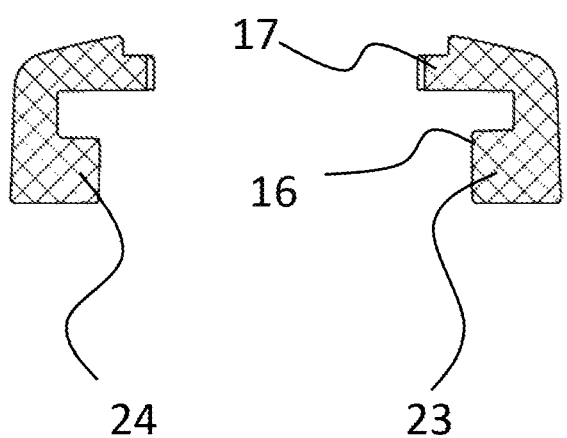

FIG. 10 is a sectional view taken along line D-D of FIG. 9.

Rib 23 is thicker than rib 24. As a result, the spacing between collar 16 and collar 17 decreases towards rib 23. Hence, the groove defined between collars 16, 17 narrows along the circumference thereof. In cooperation with the collar 8 shown in FIG. 1, which has a thickness that changes along the circumference thereof, a jamming effect is achieved in a locking position in this way, which will be explained in more detail below with reference to FIG. 15.

Thus, slanted sliding surfaces are defined between the collar 8 and the locking element 9.

Figure 11:
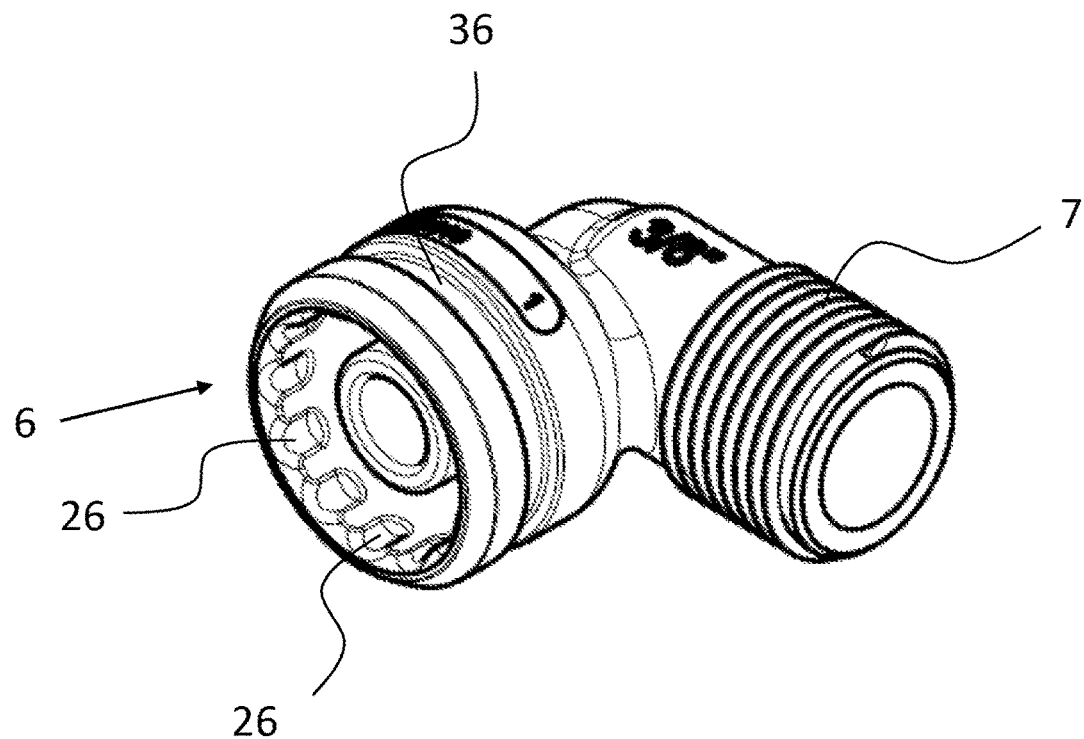
FIG. 11 is a perspective view of an exemplary embodiment of an adapter piece.

FIG. 11 is a perspective view of the adapter piece 6 that has already been illustrated in FIG. 1.

In this embodiment, adapter piece 6 is in the form of an angle piece. At the connection end to the connection head, the adapter piece 6 has an annular groove 36 in which the collar 17 illustrated in FIG. 7 engages.

Furthermore, the adapter piece has a hose port 7, which is designed as a threaded portion in this exemplary embodiment.

At the end of the port to the connection head, the adapter piece has form-fitting features 26 which are formed as rounded recesses in this exemplary embodiment and which are complementary to the form-fitting features 14 of port 5 as shown in FIG. 5.

In another embodiment not illustrated here, the adapter piece does not have any form-fitting features. An adapter piece of such a design would be rotatable about 360° even in its locked state and can be brought into any position, if necessary.

Figure 12:
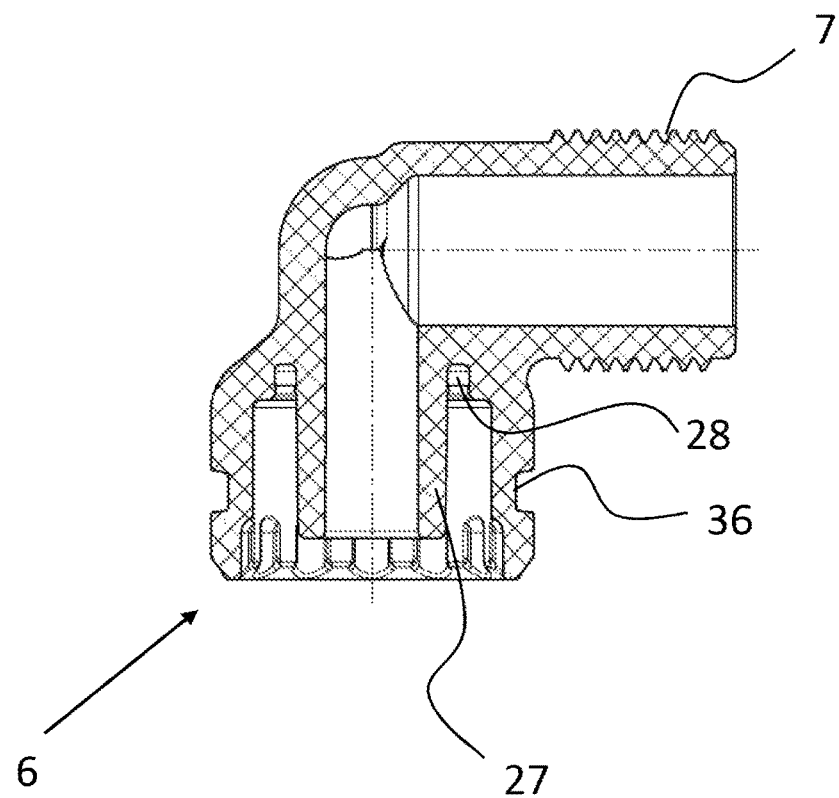
FIG. 12 is a sectional view of the adapter piece illustrated in FIG. 11.

FIG. 12 is a sectional view of the adapter piece illustrated in FIG. 11.

The port on the end towards the connection head comprises an inner tube 27.

Figure 20:
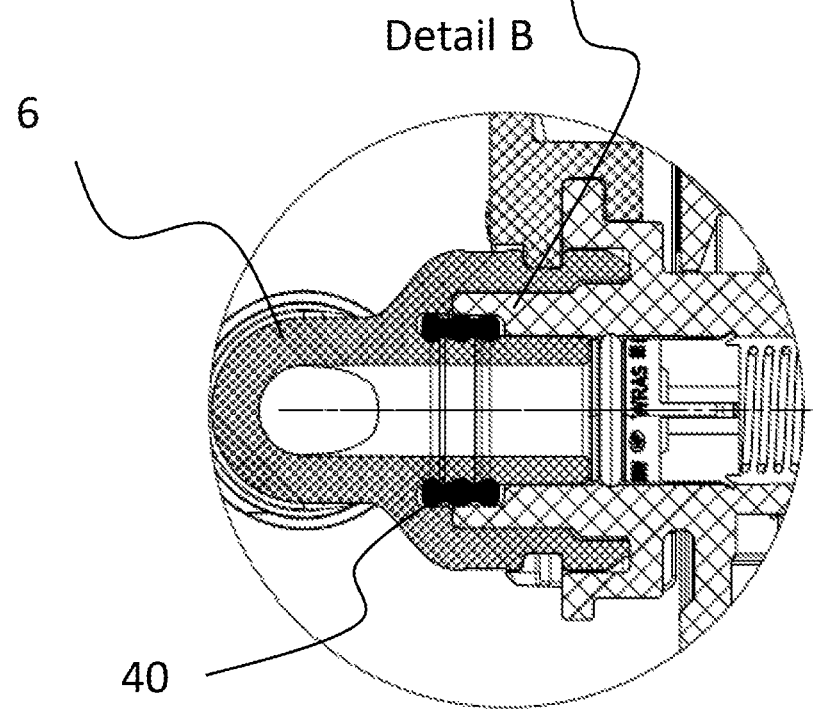
FIG. 20 is a view of a detail of FIG. 19.

At the end of tube 27, an annular groove 28 extends around the tube and serves for insertion of a molded gasket which is not in place in this view (40 in FIG. 20).

Figure 13:
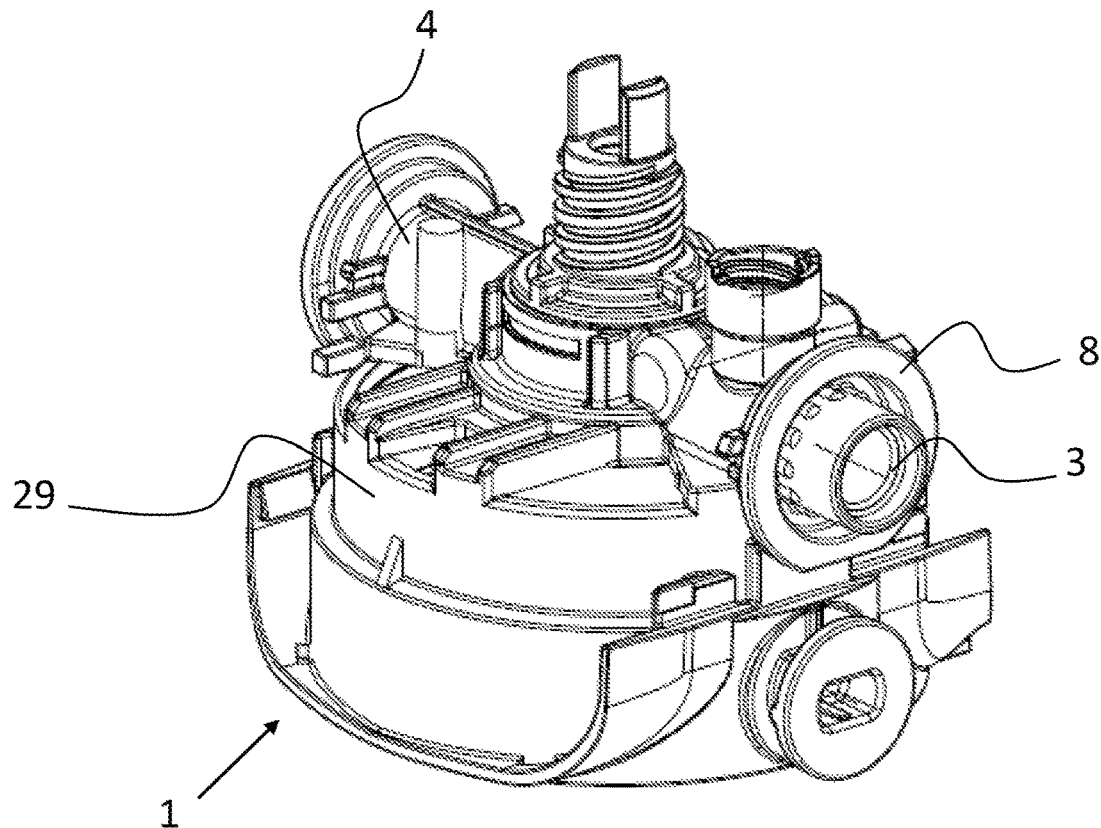
FIG. 13 is a perspective view of the connection head with the outer housing removed.

FIG. 13 is a perspective view of the connection head 1 with the outer housing removed thus allowing to see the inner part 29 of the housing.

The connection head 11 has an inlet 4 and an outlet 3, wherein inlet 4 and outlet 3 are essentially designed identically and each comprise a port 5 with a collar 8 for placing a locking element.

Figure 14:
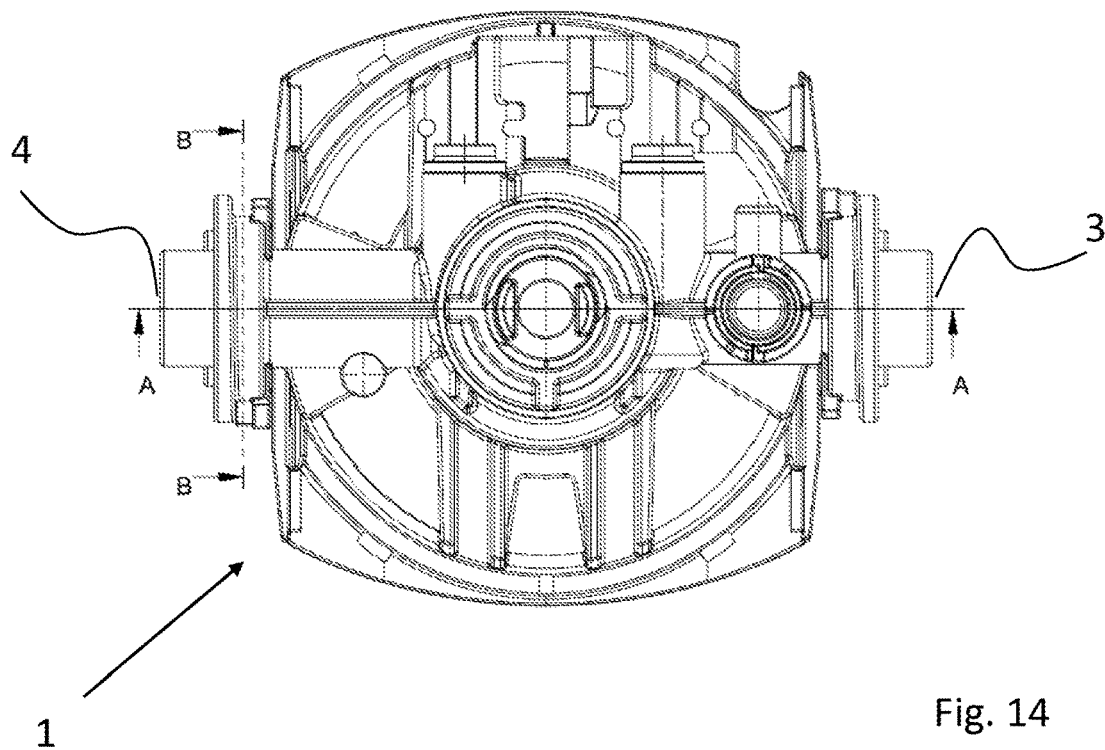
FIG. 14 is a plan view of the upper side of the connection head illustrated in FIG. 13.

FIG. 14 is a plan view of the upper side of the connection head 6 illustrated in FIG. 13, with inlet 4 and outlet 3.

Figure 15:
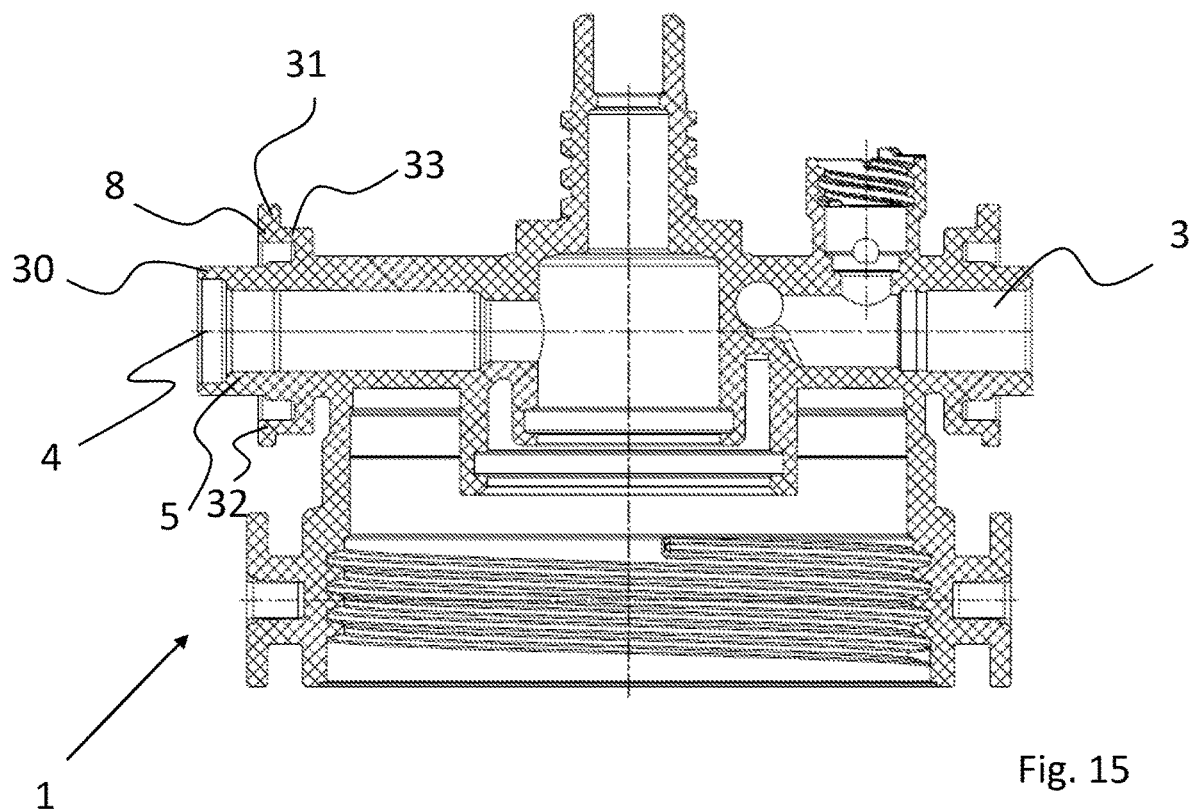
FIGS. 15 and 16 are sectional views of the connection head illustrated in FIG. 14.

FIG. 15 is a sectional view of connection head 1 taken along line A-A indicated in FIG. 14.

Here, again, inlet 4 and outlet 3 are illustrated located opposite to each other.

The configuration of one of ports 5 will now be explained referring to the inlet 4.

Port 5 comprises a tubular portion which terminates at the end face 30 and which is inserted into the adapter piece when the adapter piece is installed.

Port 5 comprises a collar 8 which serves for the connection with the locking element which in turn has the collar 16 with ribs 22 and 23 as illustrated in FIGS. 9 and 10 for this purpose.

In this exemplary embodiment, collar 8 is thicker on the upper side 31 than on the lower side 32. The thickness of collar 8 thus changes over the circumference thereof.

In cooperation with the geometry of the locking element as illustrated in FIG. 10, with a groove located between collars 16 and 17 and narrowing over the circumference thereof, a force can thus be generated in the axial direction urging the adapter piece onto port 5.

At the same time, the locking element once being placed on the collar 8 initially has clearance but then becomes jammed in a locked position.

Figure 16:
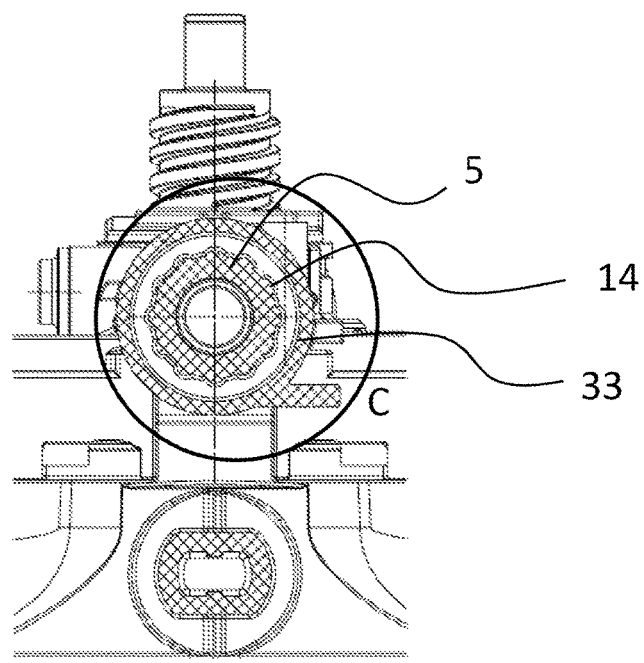

FIG. 16 is a sectional view taken along line B-B indicated in FIG. 14.

This section has been taken along a plane below the collar of port 5.

What can be seen is the port 5 with the form-fitting features 14 for the adapter piece.

Furthermore, it can be seen that a tubular portion 33 extends around port 5 with the form-fitting features 14, which serves as a support for the collar 8.

Figure 17:
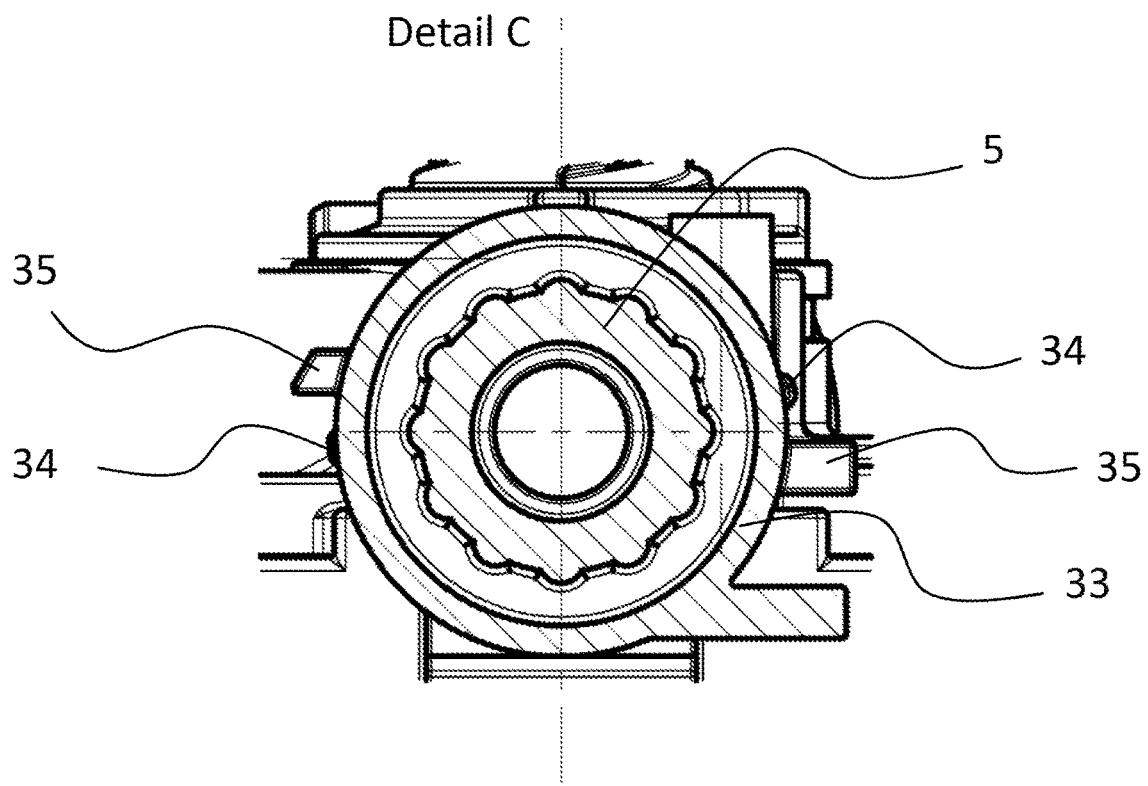
FIG. 17 is a view of a detail of FIG. 16.

FIG. 17 is a detailed view of the section C of FIG. 16.

In this detailed view, two opposite projections 34 can be seen protruding from tubular portion 33.

The projections 34 are preferably rounded and serve to latch the locking element 9 in a locked position.

When the locking element 9 is moved into the locked position as illustrated in FIG. 4, the lugs 24, 25 illustrated in FIG. 9 will slide over the projections 34.

Furthermore, in the locked state, the ribs 22, 23 illustrated in FIG. 9 will engage stops 35, so that the locking element will be latched in its locked state, as the ribs 22, 23 will be located between projections 34 and stops 35.

For removing the locking element, the user first has to apply an increased force until the lugs 24, 25 have slipped over the projections 34.

Figure 18:
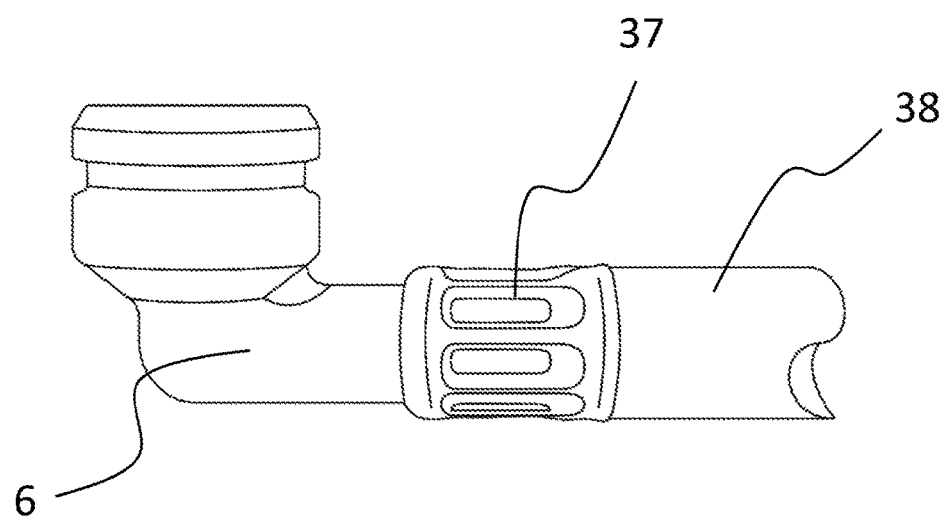
FIG. 18 shows a connection piece with a hose firmly joined thereto.

FIG. 18 is a view of an adapter piece 6 which is likewise designed as an angle-shaped adapter piece.

In contrast to the previously illustrated exemplary embodiment, this adapter piece is inseparably connected to a hose 38.

For this purpose, the hose 38 is pressed onto the adapter piece 6 by means of a clamping sleeve 37.

In this way, an inexpensive and compact connection option is provided, which is flexible and which allows filter cartridges to be adapted in a very simple manner to different conditions at the installation site.

Figure 19:
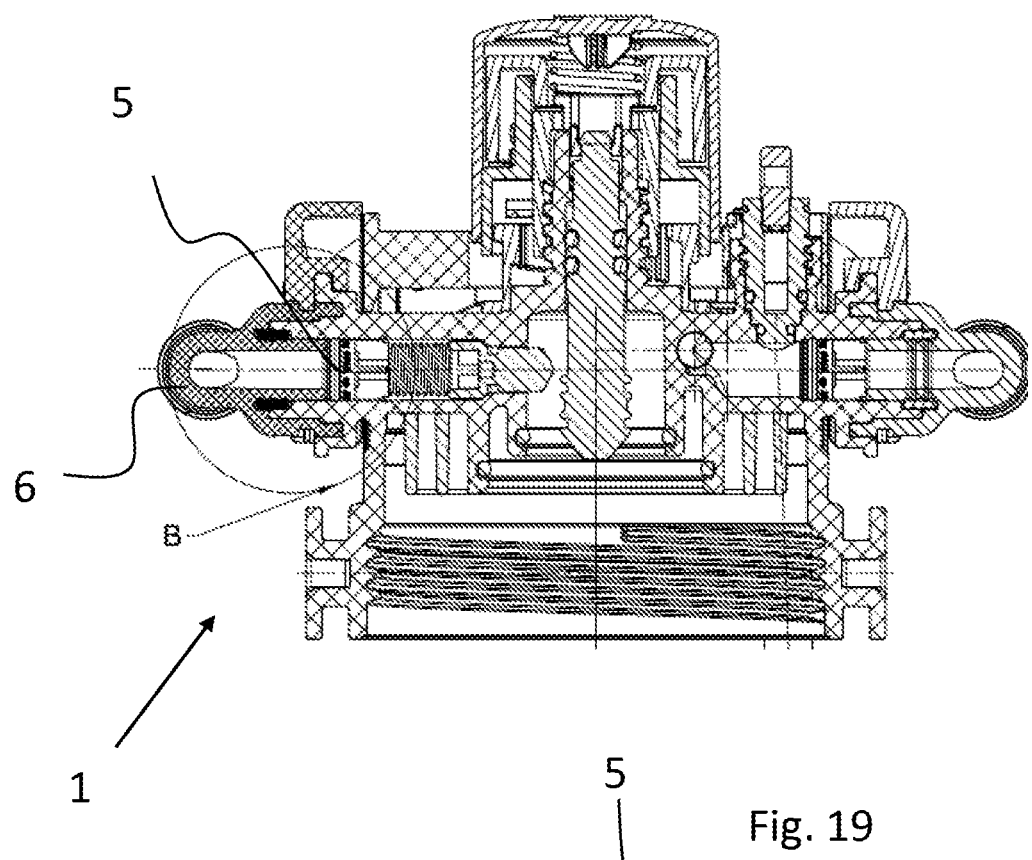
FIG. 19 is a sectional view of the connection head with the adapter piece installed, the adapter piece being equipped with a molded gasket.

FIG. 19 is a further sectional view of the connection head 1 with the adapter piece 6 inserted.

As can be seen in the detailed view of FIG. 20 which shows the connection area B of FIG. 19, a molded gasket 40 is now pressed into the groove (28 in FIG. 12) of the adapter piece 6.

Molded gasket 40 is fixedly joined to the rest of the adapter piece 6. The user therefore does not need to insert a gasket and, moreover, the gasket cannot be lost.

Sealing between the adapter piece 6 and the port 5 is achieved by molded gasket 40. The connection is preferably liquid-tight as soon as the adapter piece 6 has been fitted, and the contact pressure is further increased by the locking using the locking element, in order to be able to withstand even elevated pressures which may be encountered at the installation site.

LIST OF REFERENCE NUMERALS

1 Connection head
2 Housing
3 Outlet
4 Inlet
5 Port
6 Adapter piece
7 Hose port
8 Collar
9 Locking element
10 Actuating element for bypass
11 Window
12 Seat
13 Wall holder
14 Form-fitting feature
15 Recess
16 Collar
17 Collar
18 Bevel
19 Bevel
20 Thickened portion
21 Passage
22 Rib
23 Rib
24 Lug
25 Lug
26 Form-fitting feature
27 Tube
28 Groove
29 Inner part of housing
30 End face
31 Upper side
32 Lower side
33 Tubular portion
34 Projection
35 Stop
36 Groove
37 Clamping sleeve
38 Hose
39 Groove
40 Molded gasket

The invention claimed is:

1. A connection head for a filter cartridge, said filter cartridge connectable into a water conduit and including a treatment material, said connection head comprising a housing having an inlet and an outlet, the inlet and the outlet being configured to connect the filter cartridge inline into the water conduit, wherein the inlet has a port to which a first detachable adapter piece for the water conduit can be mounted, wherein the outlet has a port to which a second detachable adapter piece for the water conduit can be mounted, wherein the first and the second adapter pieces are each attachable by a quick-release fastener, and wherein each of the quick-release fasteners comprises a locking element that locks its corresponding one of the first and second adapter pieces by being rotated less than about 90 degrees.

2. The connection head for a filter cartridge according to claim 1, wherein the locking element locks the adapter piece by being rotated about 45 degrees.

3. The connection head for a filter cartridge according to claim 1, wherein the locking element is slidingly mountable on the port, thereby providing a liquid-tight connection.

4. The connection head for a filter cartridge according to claim 1, wherein the quick-release fastener is configured so that upon locking of the quick-release fastener the first and second detachable adapter pieces are urged onto the port with an axial force.

5. The connection head for a filter cartridge according to claim 1, wherein the first and second detachable adapter pieces are secured against rotation relative to the port.

6. The connection head for a filter cartridge according to claim 1, wherein the first and second detachable adapter pieces are securable in a plurality of positions rotated about 90 degrees or less.

7. The connection head for a filter cartridge according to claim 1, wherein the first and second adapter pieces have a connection portion for a water conduit.

8. The connection head for a filter cartridge according to claim 1, wherein the first and second detachable adapter pieces are inseparably connected to a water conduit in the form of a hose.

9. The connection head for a filter cartridge according to claim 1, wherein the connection head comprises an actuating element for an adjustable bypass.

10. The connection head for a filter cartridge according to claim 1, wherein the first and second detachable adapter pieces are in the form of an angled piece.

11. A kit, comprising a connection head according to claim 1 and at least two different adapter pieces.

12. A filter cartridge, comprising a connection head according to claim 1.

* * * * *